(12) United States Patent
Morita et al.

(10) Patent No.: US 12,291,260 B2
(45) Date of Patent: May 6, 2025

(54) STEERING WHEEL

(71) Applicant: TOYODA GOSEI CO., LTD., Kiyosu (JP)

(72) Inventors: Bunpei Morita, Kiyosu (JP); Motoya Funatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 29 days.

(21) Appl. No.: 18/349,371

(22) Filed: Jul. 10, 2023

(65) Prior Publication Data

US 2024/0025466 A1    Jan. 25, 2024

(30) Foreign Application Priority Data

Jul. 21, 2022  (JP) .................. 2022-116559

(51) Int. Cl.
| | |
|---|---|
| *B62D 1/06* | (2006.01) |
| *B60K 26/02* | (2006.01) |
| *B60T 7/10* | (2006.01) |
| *G05G 1/01* | (2008.04) |
| *G05G 9/02* | (2006.01) |

(52) U.S. Cl.
CPC .............. *B62D 1/06* (2013.01); *B60K 26/02* (2013.01); *B60T 7/102* (2013.01); *G05G 1/01* (2013.01); *G05G 9/02* (2013.01); *B60K 2026/028* (2013.01)

(58) Field of Classification Search
CPC ........ B60K 2026/028; B60K 2026/029; B90T 7/102; B62D 1/046
See application file for complete search history.

(56) References Cited

U.S. PATENT DOCUMENTS

| | | | | |
|---|---|---|---|---|
| 2012/0096969 | A1* | 4/2012 | Prokhorov | B60K 26/02 74/471 R |
| 2014/0305257 | A1* | 10/2014 | Frei | B66F 9/07568 74/551.9 |
| 2016/0052390 | A1* | 2/2016 | Park | G05G 1/04 74/473.31 |
| 2016/0375764 | A1* | 12/2016 | Downey | B60K 26/02 74/511 R |
| 2018/0111671 | A1* | 4/2018 | Shibayama | G05D 1/0206 |
| 2022/0234644 | A1* | 7/2022 | Yamamoto | A61F 4/00 |

FOREIGN PATENT DOCUMENTS

| | | | |
|---|---|---|---|
| JP | H05-270410 A | 10/1993 | |
| JP | H09-150781 A | 6/1997 | |
| JP | 2008-014204 A | 1/2008 | |
| KR | 19980013565 U | * 6/1998 | |
| WO | WO-2007051523 A1 | * 5/2007 | ............. B60K 20/06 |

* cited by examiner

*Primary Examiner* — Daniel D Yabut
(74) *Attorney, Agent, or Firm* — Posz Law Group, PLC

(57) ABSTRACT

A steering wheel includes: a steering portion which is gripped and steered by a driver; a boss portion which is disposed inside the steering portion and is coupled to a steering center shaft of the steering portion; and an operation portion which is disposed adjacent to the steering portion, and is configured to be swingable with respect to the steering portion, to input an accelerator operation by being operated to swing in a first direction with respect to the steering portion, and to input a brake operation by being operated to swing in a second direction opposite to the first direction.

7 Claims, 9 Drawing Sheets

STEERING WHEEL

CROSS-REFERENCE TO RELATED APPLICATION

This application is based on and claims priority under 35 USC 119 from Japanese Patent Application No. 2022-116559 filed on Jul. 21, 2022.

TECHNICAL FIELD

The present disclosure relates to a steering wheel including an operation portion for inputting an accelerator operation and a brake operation.

BACKGROUND ART

As in a configuration described in JP2008-14204A, a configuration is known in which an operation portion for inputting an accelerator operation and an operation portion for inputting a brake operation are separately provided in a steering wheel.

SUMMARY OF INVENTION

As in the configuration of JP2008-14204A, when the operation portion for inputting the accelerator operation and the operation portion for inputting the brake operation are separately provided, a driver needs to switch the operation portion when switching the operation between the accelerator operation and the brake operation, and thus the operation of the driver is complicated.

Accordingly, an object of the present disclosure is to provide a steering wheel including an operation portion capable of inputting both the accelerator operation and the brake operation.

According to an aspect of the present disclosure, there is provided a steering wheel including: a steering portion which is gripped and steered by a driver; a boss portion which is disposed inside the steering portion and is coupled to a steering center shaft of the steering portion; and an operation portion which is disposed adjacent to the steering portion, and is configured to be swingable with respect to the steering portion, to input an accelerator operation by being operated to swing in a first direction with respect to the steering portion, and to input a brake operation by being operated to swing in a second direction opposite to the first direction.

According to the present disclosure, the accelerator operation is input when the operation portion is operated to swing in the first direction, and the brake operation is input when the operation portion is operated to swing in the second direction. Therefore, since the driver can perform both the accelerator operation and the brake operation by one operation portion without switching the operation portion, it is possible to prevent the operation of the driver from being complicated.

It is preferable that the operation portion swings in the first direction by being pressed by the driver, and swings in the second direction by being pulled up by the driver.

During driving, a frequency of the accelerator operation is generally higher than a frequency of the brake operation. In addition, since the driver drives in a forward-leaning posture, pressing the operation portion using a palm or a thumb by using his or her own weight makes it easier to swing the operation portion than pulling up the operation portion using four fingers other than the thumb. Therefore, with such a configuration, since the driver can easily operate the accelerator operation, which is relatively frequently operated, an operation burden on the driver can be reduced.

It is preferable that the operation portion is a right operation portion disposed on a right side with respect to the boss portion. The steering wheel further includes a left operation portion which is disposed on a left side of the boss portion, and is configured to be swingable with respect to the steering portion, to input the accelerator operation by being operated to swing in a third direction with respect to the steering portion, and to input the brake operation by being operated to swing in a fourth direction opposite to the third direction, and swing of the right operation portion in the first direction and swing of the left operation portion in the third direction are synchronized with each other, and the swing of the right operation portion in the second direction and the swing of the left operation portion in the fourth direction are synchronized with each other, by a power transmission mechanism mechanically transmitting power of one of the right operation portion or the left operation portion during swinging to the other.

With such a configuration, since the driver can perform the accelerator operation and the brake operation by using both left and right hands, operability of the steering wheel can be improved. In addition, since swing motions of the right operation portion and the left operation portion are synchronized, an erroneous operation such as the accelerator operation being performed with the right operation portion and the brake operation being performed with the left operation portion is prevented.

In addition, it is preferable that a right swing shaft, which is a swing shaft of the right operation portion, is disposed along a direction intersecting with a left-right direction at the right side of the boss portion, a left swing shaft, which is a swing shaft of the left operation portion, is disposed substantially parallel to the right swing shaft at a position symmetrical to the right swing shaft with respect to the boss portion, and the power transmission mechanism is a link mechanism including a rotary member in which a rotary shaft is disposed so as to be substantially parallel to the left swing shaft at a position with substantially equal interval to each of the left swing shaft and the right swing shaft in the left-right direction, a first link coupled to the rotary member and configured to rotate the rotary member in a first rotation direction by moving in conjunction with a swing operation of the right operation portion in the first direction, and to rotate the rotary member in a second rotation direction opposite to the first rotation direction by moving in conjunction with a swing operation of the right operation portion in the second direction, and a second link coupled to the rotary member at a position symmetrical to a coupling position between the first link and the rotary member with respect to the rotary shaft, and configured to rotate the rotary member in the first rotation direction by moving in conjunction with a swing operation of the left operation portion in the third direction, and to rotate the rotary member in the second rotation direction by moving in conjunction with a swing operation of the left operation portion in the fourth direction.

In this way, by using the link mechanism as a mechanism for synchronizing the swing motion of the right operation portion and the swing motion of the left operation portion, since a space for a plurality of gears and support shafts supporting the gears can be saved as compared with a configuration in which synchronization is performed using a gear train, a size of the steering wheel can be reduced.

In addition, it is preferable that the link mechanism is disposed below the steering portion.

With such a configuration, when an airbag is provided on the steering wheel, it is possible to prevent the activated airbag from interfering with the link mechanism and hindering inflation.

In addition, it is preferable that the steering portion is annular, and the right operation portion and the left operation portion are disposed inside the steering portion.

With such a configuration, since the right operation portion and the left operation portion do not protrude to the outside of the steering portion, the size of the steering wheel can be reduced.

DETAILED DESCRIPTION OF THE INVENTION

Figure 1:
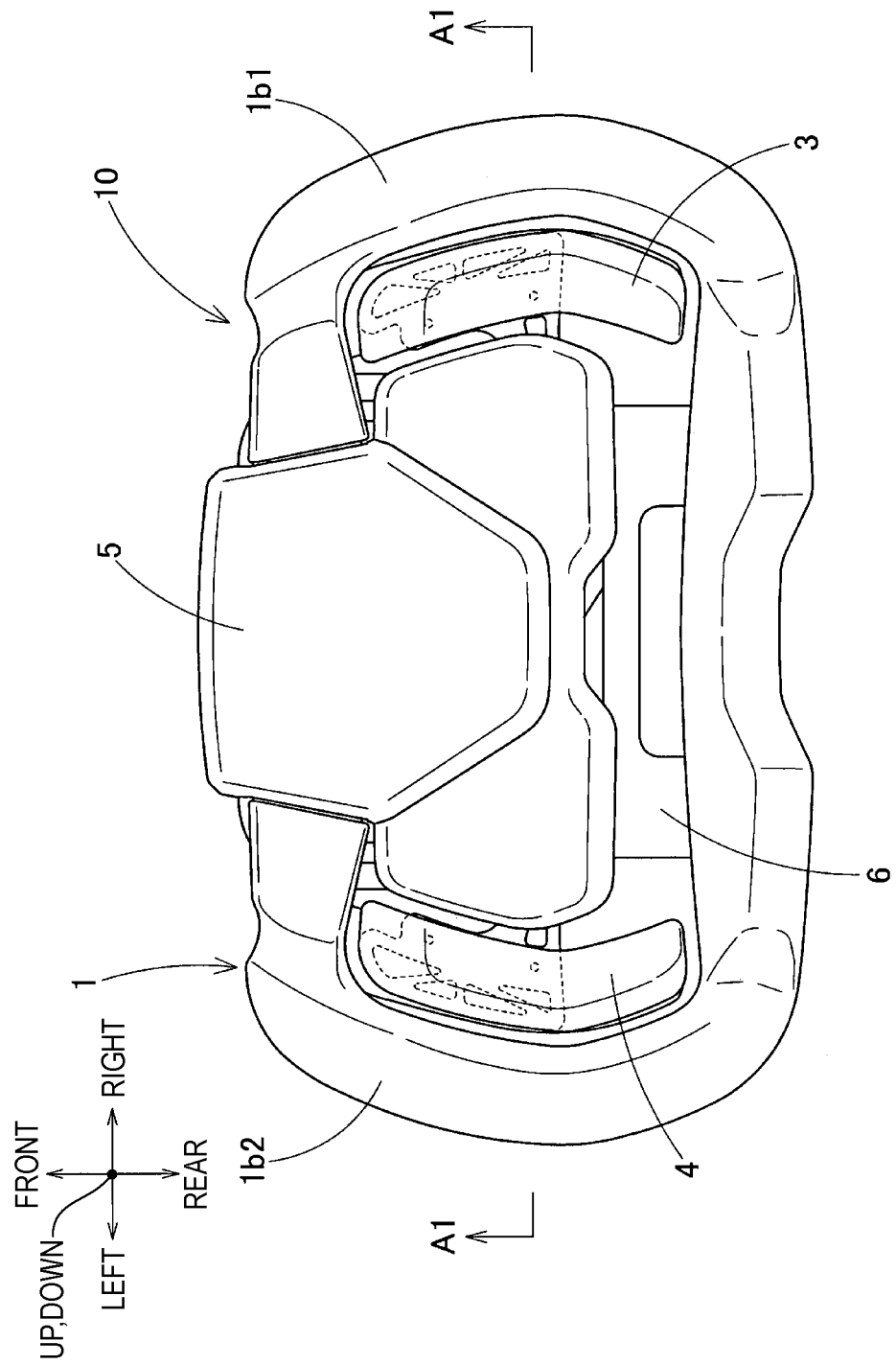
FIG. 1 is a plan view of a steering wheel according to an embodiment of the present disclosure.

Hereinafter, a steering wheel 10 according to an embodiment of the present disclosure will be described. The steering wheel 10 is mounted on a vehicle which is not shown in the drawings. In the following description, unless otherwise specified, an up-down direction refers to an up-down direction along an axial direction of a steering shaft (not shown in the drawings), a front-rear direction refers to a front-rear direction that is orthogonal to the axial direction of the steering shaft during straight steering of a vehicle, and a left-right direction refers to a left-right direction that is orthogonal to the axial direction of the steering shaft during the straight steering of the vehicle.

Figure 2:
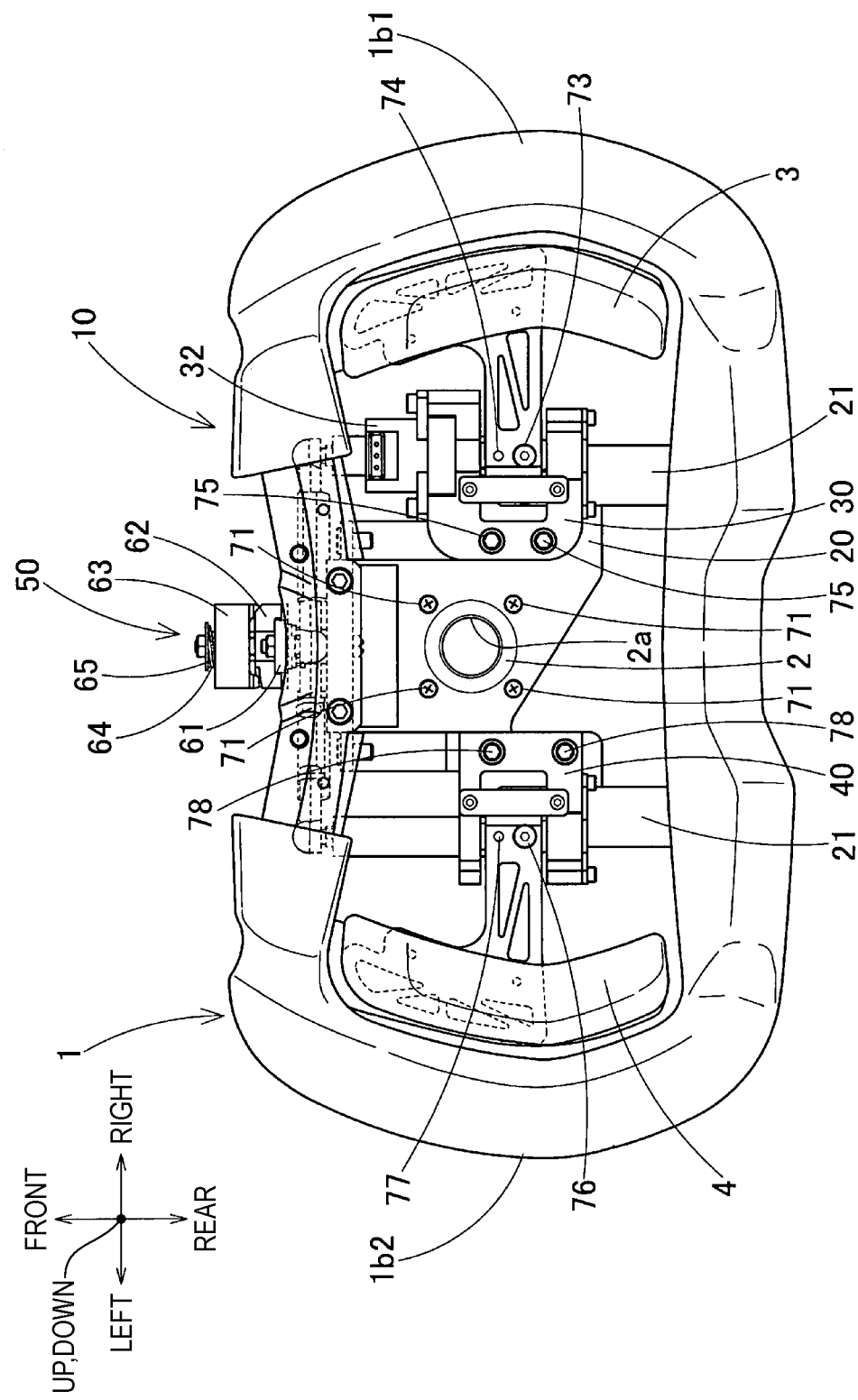
FIG. 2 is a plan view of the steering wheel in a state in which a pad and a lower cover are removed.
Figure 3:
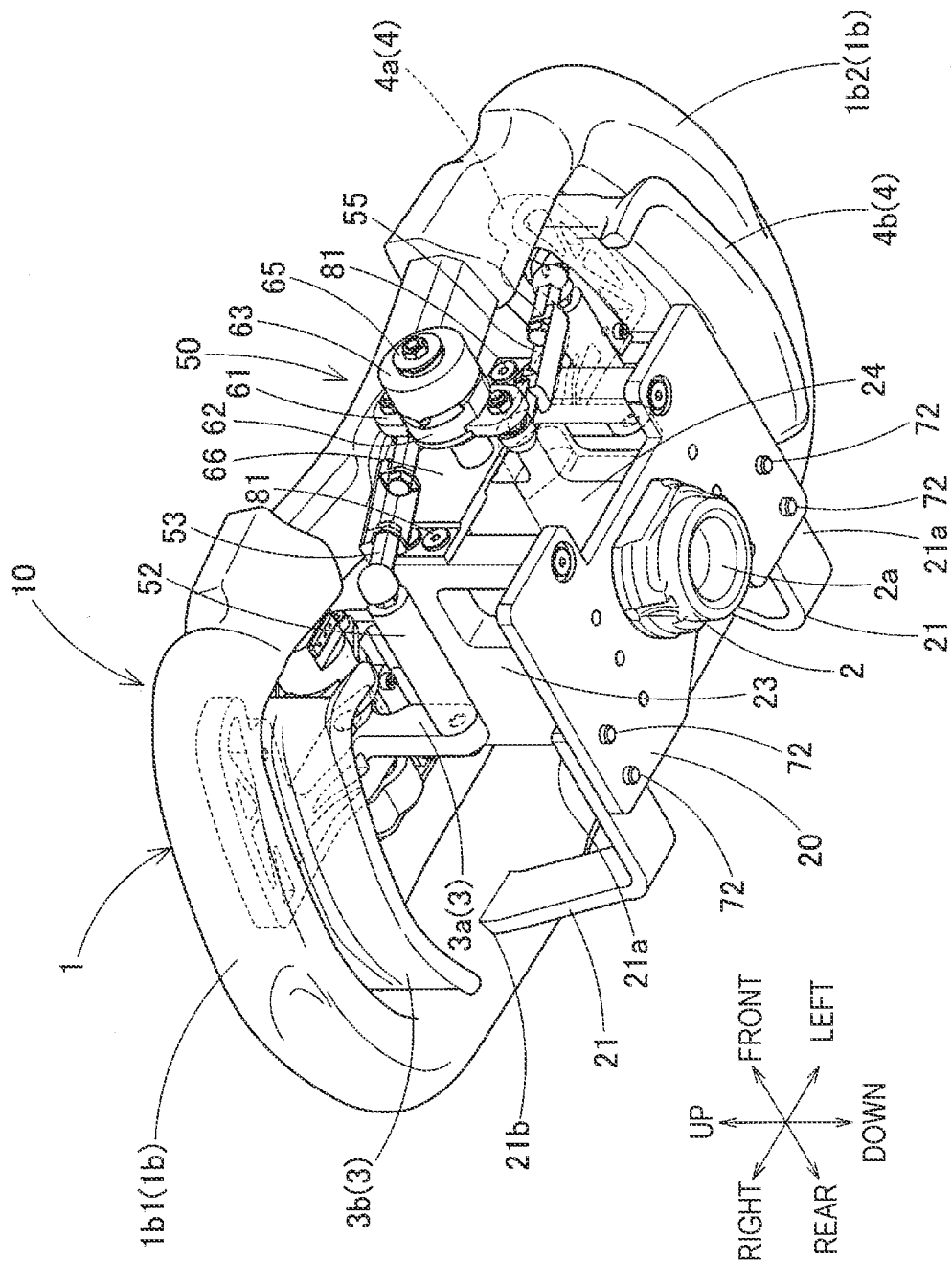
FIG. 3 is a perspective view of the steering wheel in the state in which the pad and the lower cover are removed, which is as viewed from below.
Figure 4:
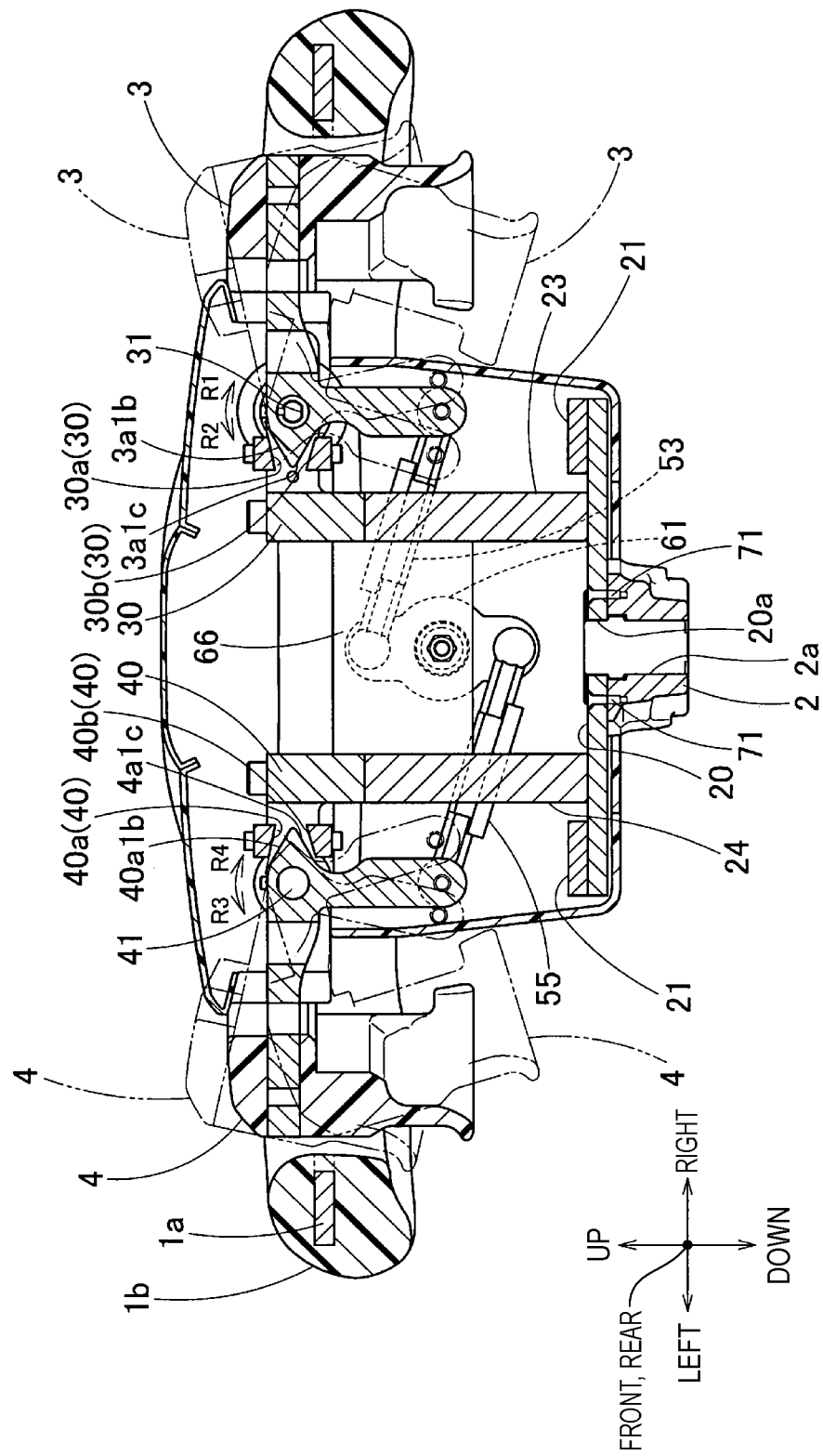
FIG. 4 is a cross-sectional view of the steering wheel taken along a line A1-A1 in FIG. 1.
Figure 5:
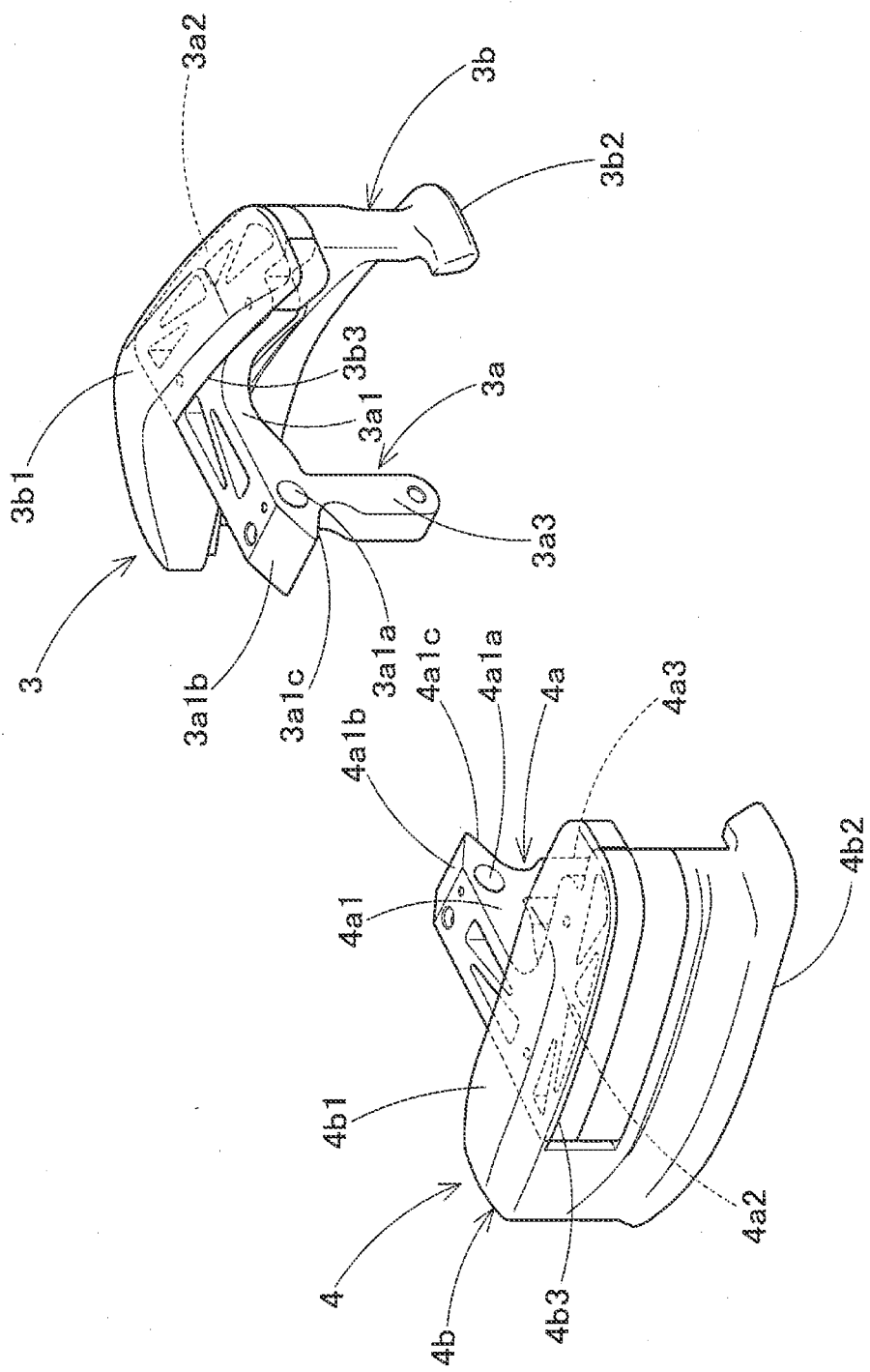
FIG. 5 is a perspective view of operation levers of the steering wheel.

FIG. 1 is a plan view of the steering wheel 10. FIG. 2 is a plan view of the steering wheel 10 in a state in which a pad 5 and a lower cover 6 is removed. FIG. 3 is a perspective view of the steering wheel 10 in the state in which the pad 5 and the lower cover 6 are removed, which is as viewed from below. FIG. 4 is a cross-sectional view of the steering wheel 10 taken along a line A1-A1 in FIG. 1. FIG. 5 is a perspective view of operation levers 3 and 4 of the steering wheel 10.

As shown in FIGS. 1 to 5, the steering wheel 10 includes a steering portion 1 that is gripped and rotationally steered by a driver of a vehicle, a boss portion 2 that is disposed inside the steering portion 1 and is coupled to a steering shaft (not shown in the drawings) serving as a steering shaft, the pad 5 that covers an upper side of the boss portion 2, and a lower cover 6 that is disposed on a lower surface side of the steering wheel 10. The steering wheel 10 includes the operation levers 3 and 4 which are separately disposed on a right side and a left side of the boss portion 2 and are used to input an accelerator operation and a brake operation.

The steering portion 1 is a substantially elliptical annular member elongated in the left-right direction, and is formed of a core metal 1a and a resin cover 1b covering the core metal 1a. Parts on the left and right sides of the boss portion 2 in the resin cover 1b of the steering portion 1 are grip portions 1b1 and 1b2 that the driver grips with both hands during normal driving. The driver grips the grip portions 1b1 and 1b2, and changes a traveling direction of the vehicle by rotating and steering the steering portion 1 about the steering shaft (not shown in the drawings) coupled to the boss portion 2.

The boss portion 2 is disposed at the center of the steering portion 1, and has a shaft hole 2a into which the steering shaft (not shown in the drawings) is inserted and fitted. In a state in which a tip end portion of the steering shaft is inserted and fitted into the shaft hole 2a of the boss portion 2, the tip end portion of the steering shaft is fastened with a nut, such that the boss portion 2 and the steering shaft are coupled to each other.

Note that, between the boss portion 2 and the pad 5, an airbag (not shown in the drawings) is mounted, which is folded and stored and which is inflated by inflation gas flowing from an inflator (not shown in the drawings) at the time of collision of the vehicle to protrude toward a driver side and that receives and protects the driver moving toward a front side of the vehicle.

Further, the boss portion 2 is coupled to the steering portion 1 through a supporting metal plate 20 and two coupling members 21. Specifically, the boss portion 2 is supported by the supporting metal plate 20 by being fitted into a boss supporting hole 20a of the supporting metal plate 20, which is a flat metal plate, and is fixed to the supporting metal plate 20 by screws 71. One end portion 21a of each of the coupling member 21, which is a metal plate bent into an L-shape, is fixed to the supporting metal plate 20 with screws 72, and the other end portion 21b is fixed to a lower surface side of the core metal 1a of the steering portion 1 with screws (not shown in the drawings). In this way, the boss portion 2 and the steering portion 1 are coupled to each other.

The operation lever 3 as a right operation portion is a member that is disposed on a right side of the boss portion 2 and inside the steering portion 1 to be adjacent to the steering portion 1, and is swingable with respect to the steering portion 1, and includes a core metal 3a made of metal and an operation cover 3b made of resin. The core metal 3a includes a shaft support portion 3a1 which extends in the left-right direction and is pivotally supported by a swing shaft 31 of the operation lever 3, a cover attachment portion 3a2 which extends in a direction substantially orthogonal to one end side of the shaft support portion 3a1 and to which the operation cover 3b is attached, and a connection portion 3a3 which extends downward from the other end side from the shaft support portion 3a1 and is connected to a link mechanism 50 which will be described later.

A shaft hole 3a1a is formed in the shaft support portion 3a1 of the core metal 3a, and the swing shaft 31 swingably supported by a lever support member 30 is inserted into the shaft hole 3a1a. The swing shaft 31 is disposed to be parallel to the front-rear direction orthogonal to (intersecting) the left-right direction. The shaft support portion 3a1 and the swing shaft 31 are fixed so as not to move relative to each other by a screw 73 and a pin 74. In this way, the operation lever 3 is swingable about the swing shaft 31 in an arrow R1 direction shown in FIG. 4 and an arrow R2 direction opposite thereto. Swing of the operation lever 3 in the arrow R1 direction is regulated at a predetermined swing angle by a regulating surface 3a1b formed at the shaft support portion 3a1 of the core metal 3a abutting against a swing regulating portion 30a of the lever support member 30, and swing of the operation lever 3 in the arrow R2 direction is regulated at a predetermined swing angle by a regulating surface 3a1c formed at the shaft supporting portion 3a1 of the core metal 3a abutting against a swing regulating portion 30b of the lever support member 30. In the vicinity of the swing shaft 31 in the lever support member 30, a swing angle of the swing shaft 31 can be detected, and a magnetic rotation angle sensor 32 electrically connected to a CPU (not shown in the drawings) is provided. In addition, a metal supporting base 23 is erected on a right end side of the supporting metal plate 20, and the lever support member 30 is fixed to the supporting base 23 by screws 75.

Since the operation cover 3b is a portion touched by a hand of the driver when the driver operates to swing the operation lever 3, the operation cover 3b is formed of resin so as to have a good tactile feel. The operation cover 3b includes an accelerator operation surface 3b1, which is a portion on an upper surface side thereof and is a portion to be pressed with a palm or a thumb of a right hand when the driver performs the accelerator operation, a brake operation surface 3b2 which is a portion on a lower surface side and is pressed by four fingers other than the thumb when the driver performs the brake operation, and a fitting hole 3b3 into which the cover attachment portion 3a2 of the core metal 3a is fitted and fixed with a screw (not shown in the drawings). In order to enhance operability of the driver, at least a part of the accelerator operation surface 3b1 of the operation cover 3b is positioned on a driver side with respect to the steering portion 1, and at least a part of the brake operation surface 3b2 is positioned on a side away from the driver with respect to the steering portion 1.

The operation lever 3 inputs the accelerator when the accelerator operation surface 3b1 of the operation cover 3b is pressed by the palm or the thumb of the right hand of the driver and is operated to swing in the arrow R1 direction as a first direction, and inputs the brake when the brake operation surface 3b2 of the operation cover 3b is pulled up by other four fingers other than the thumb and is operated to swing in the arrow R2 direction as a second direction. Specifically, when the operation lever 3 is operated to swing, the swing angle of the swing shaft 31 is detected by the rotation angle sensor 32, and the CPU (not shown in the drawings) controls an acceleration and deceleration device of the vehicle based on a detection signal received from the rotation angle sensor 32 to accelerate or decelerate the vehicle. Thus, when the rotation angle sensor 32 detects that the swing shaft 31 swings in the arrow R1 direction, the CPU controls the acceleration and deceleration device of the vehicle according to the swing angle of the swing shaft 31 to accelerate the vehicle. When the rotation angle sensor 32 detects that the swing shaft 31 swings in the arrow R2 direction, the CPU controls the acceleration and deceleration device of the vehicle according to the rotation angle of the swing shaft 31 to decelerate the vehicle.

The operation lever 4 as a left operation portion is disposed at a position symmetrical to the operation lever 3 with respect to the boss portion 2, and is a member having a shape symmetrical to the operation lever 3, and performs motions symmetrical to the operation lever 3. That is, the operation lever 4 is a member that is disposed on a left side of the boss portion 2 and inside the steering portion 1 to be adjacent to the steering portion 1, and is swingable with respect to the steering portion 1, and includes a core metal 4a made of metal and an operation cover 4b made of resin. The core metal 4a includes a shaft support portion 4a1 which extends in the left-right direction and is pivotally supported by a swing shaft 41 of the operation lever 4, a cover attachment portion 4a2 which extends in a direction substantially orthogonal to one end side of the shaft support portion 4a1 and to which the operation cover 4b is attached, and a connection portion 4a3 which extends downward from the other end side from the shaft support portion 4a1 and is connected to the link mechanism 50 which will be described later.

A shaft hole 4a1a is formed in the shaft support portion 4a1 of the core metal 4a, and the swing shaft 41 swingably supported by a lever support member 40 is inserted into the shaft hole 4a1a. The swing shaft 41 is disposed to be substantially parallel to the swing shaft 31 of the operation lever 3. The substantially parallel configuration includes a configuration in which the swing shaft 31 and the swing shaft 41 are shifted within a range of tolerance in addition to a configuration in which the swing shaft 31 and the swing shaft 41 are completely parallel to each other. The shaft support portion 4a1 and the swing shaft 41 are fixed so as not to move relative to each other by a screw 76 and a pin 77. In this way, the operation lever 4 is swingable about the swing shaft 41 in an arrow R3 direction shown in FIG. 4 and an arrow R4 direction opposite thereto. Swing of the operation lever 4 in the arrow R3 direction is regulated at a predetermined swing angle by a regulating surface 4a1b formed at the shaft support portion 4a1 of the core metal 4a abutting against a swing regulating portion 40a of the lever support member 40, and swing of the operation lever 4 in the arrow R4 direction is regulated at a predetermined swing angle by a regulating surface 4a1c formed at the shaft supporting portion 4a1 of the core metal 4a abutting against a swing regulating portion 40b of the lever support member 40. In addition, a metal supporting base 24 is erected on a left end side of the supporting metal plate 20, and the lever support member 40 is fixed to the supporting base 24 by screws 78.

Since the operation cover 4b is a portion touched by the hand of the driver when the driver operates to swing the operation lever 4, the operation cover 4b is formed of resin so as to have a good tactile feel. The operation cover 4b includes an accelerator operation surface 4b1, which is a portion on an upper surface side thereof and is a portion to be pressed with a palm or a thumb of a left hand when the driver performs the accelerator operation, a brake operation surface 4b2 which is a portion on a lower surface side and is pressed by four fingers other than the thumb when the driver performs the brake operation, and a fitting hole 4b3 into which the cover attachment portion 4a2 of the core metal 4a is fitted and fixed with a screw (not shown in the drawings). In order to enhance the operability of the driver, at least a part of the accelerator operation surface 4b1 of the operation cover 4b is positioned on a driver side with respect to the steering portion 1, and at least a part of the brake operation surface 4b2 is positioned on a side away from the driver with respect to the steering portion 1.

The operation lever 4 inputs the accelerator when the accelerator operation surface 4b1 of the operation cover 4b is pressed by the palm or the thumb of the driver and is operated to swing in the arrow R3 direction as a third direction, and inputs the brake when the brake operation surface 4b2 of the operation cover 4b is pulled up by other four fingers other than the thumb and is operated to swing in the arrow R4 direction as a fourth direction. In the embodiment, as described later, a swing motion of the operation lever 3 in the arrow R1 direction and a swing motion of the operation lever 4 in the arrow R3 direction are synchronized with each other, and a swing motion of the operation lever 3 in the arrow R2 direction and a swing motion of the operation lever 4 in the arrow R4 direction are synchronized with each other. Therefore, when the operation lever 4 is operated to swing in the R3 direction, the operation lever 3 swings in the R1 direction in conjunction with the swing operation, the swing angle of the swing shaft 31 of the operation lever 3 is detected by the rotation angle sensor 32, and the CPU performs the above-described control according to the swing angle to accelerate the vehicle. In addition, when the operation lever 4 is operated to swing in the R4 direction, the operation lever 3 swings in the R2 direction in conjunction with the swing operation, the swing angle of the swing shaft 31 of the operation lever 3 is detected by the rotation angle sensor 32, and the CPU performs the above-described control according to the swing angle to decelerate the vehicle. When the swing motions of the operation levers 3 and 4 are not synchronized, a rotation angle sensor that detects a swing angle of the swing shaft 41 of the operation lever 4 is separately provided, and the CPU performs the above-described control according to a detection result of the rotation angle sensor, and thus the same motion can be performed.

As described above, according to the configuration of the embodiment, the accelerator operation is input when the operation lever 3 is operated to swing in the arrow R1 direction, and the brake operation is input when the operation lever 3 is operated to swing in the arrow R2 direction. Similarly, the accelerator operation is input when the operation lever 4 is operated to swing in the arrow R3 direction, and the brake operation is input when the operation lever 4 is operated to swing in the arrow R4 direction. Therefore, since the driver can perform both the accelerator operation and the brake operation with one operation lever 3 or the operation lever 4, it is possible to prevent the operation of the driver from being complicated.

In the embodiment, the configuration is described in which the operation levers 3 and 4 input the accelerator operation by being pressed in the arrow R1 direction and the arrow R3 direction by the palm or the thumb of the hand of the driver, and input the brake operation by being pulled up in the arrow R2 direction and the arrow R4 direction by the four fingers other than the thumb of the driver. However, the present disclosure is not limited thereto, and a swing direction during the accelerator operation of the operation levers 3 and 4 and a swing direction during the brake operation may be directions opposite to the configuration in the embodiment. However, during driving, a frequency of the accelerator operation is generally higher than a frequency of brake operation. In addition, since the driver drives in a forward-leaning posture, pressing the operation levers 3 and 4 using the palm or the thumb by using his or her own weight makes it easier to swing the operation levers 3 and 4 than pulling up the operation levers 3 and 4 using four fingers other than the thumb. Therefore, by setting the swing direction according to the embodiment, since the driver can easily operate the accelerator operation, which is relatively frequently operated, an operation burden on the driver can be reduced.

Figure 6:
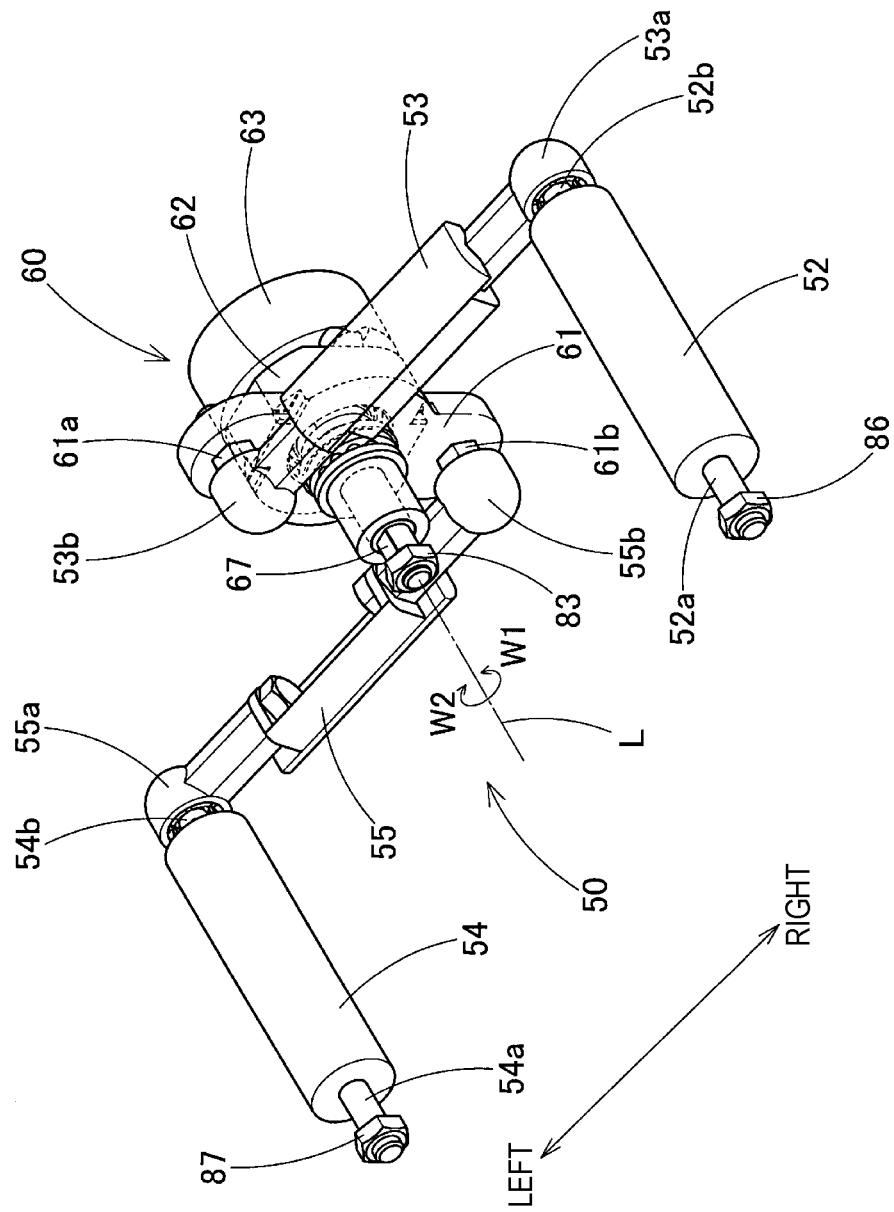
FIG. 6 is a perspective view of a link mechanism.
Figure 7:
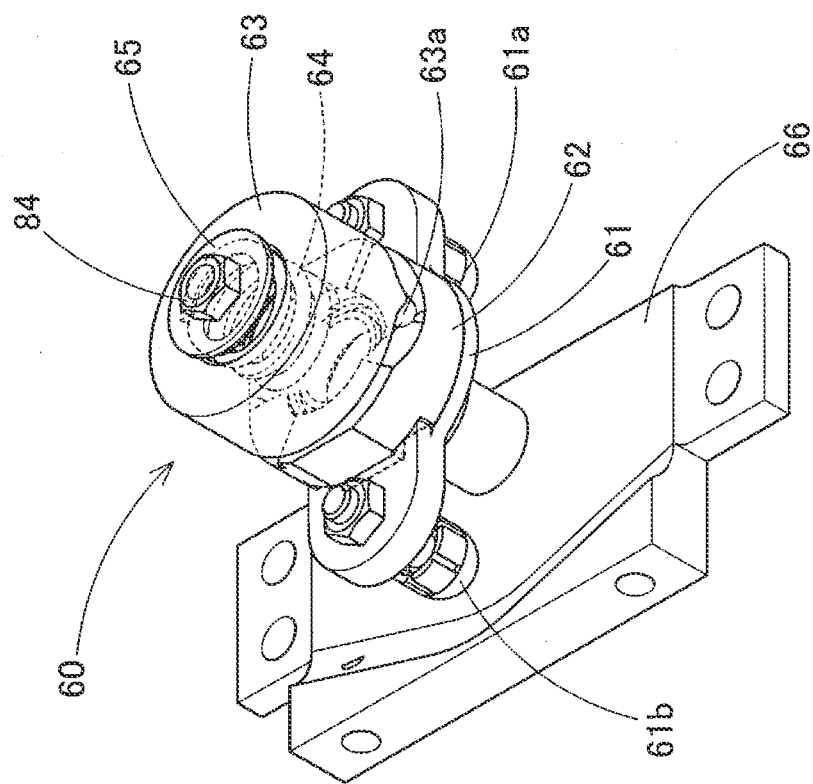
FIG. 7 is a perspective view of a cam unit of the link mechanism.
Figure 8:
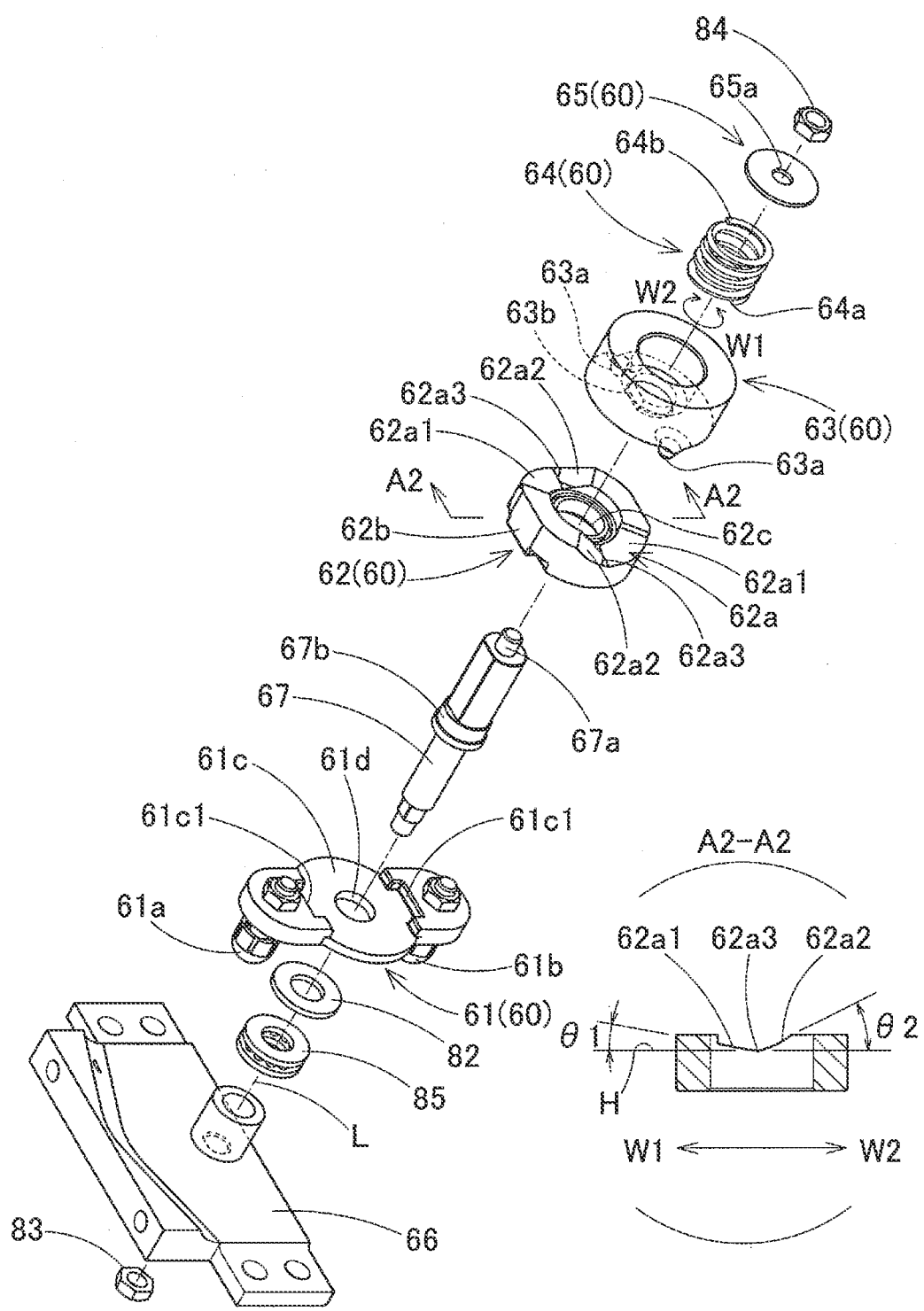
FIG. 8 is an exploded perspective view of the cam unit of the link mechanism and a cross-sectional view of a cam member.
Figure 9A:
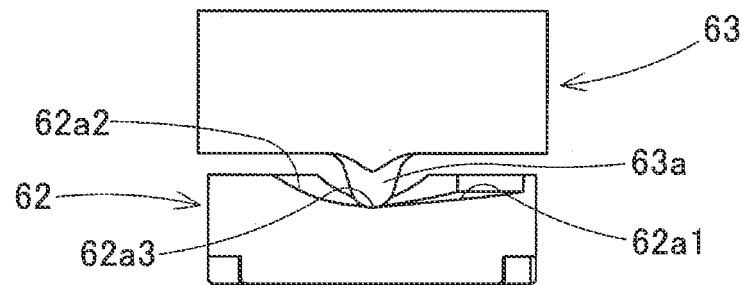
FIGS. 9A, 9B and 9C are side views of the cam member and a pusher of the cam unit.
Figure 9B:
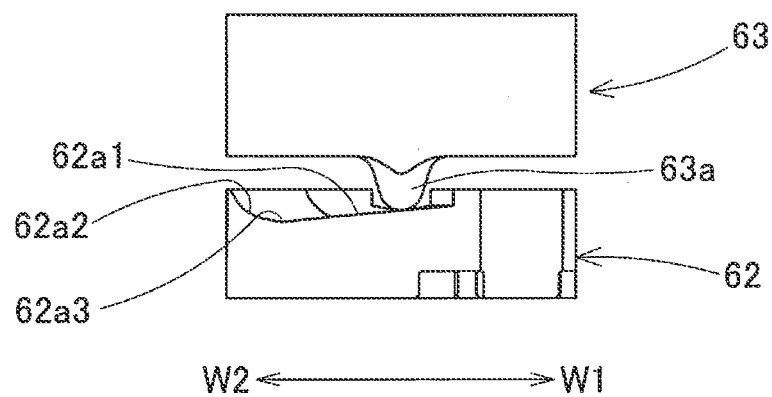
Figure 9C:
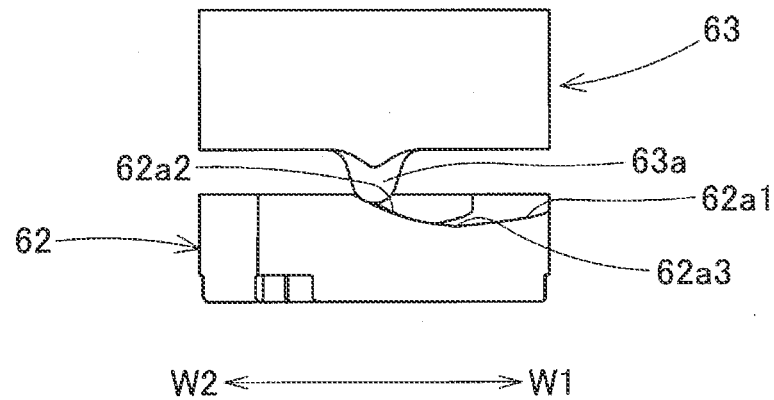

Next, a configuration of the link mechanism 50 as a power transmission mechanism that synchronizes the swing motion of the operation lever 3 and the swing motion of the operation lever 4 will be described. FIG. 6 is a perspective view of the link mechanism 50. FIG. 7 is a perspective view of a cam unit 60 of the link mechanism 50. FIG. 8 is an exploded perspective view of the cam unit 60 of the link mechanism 50 and a cross-sectional view of a cam member 62 of the cam unit 60. FIGS. 9A, 9B and 9C are side views of the cam member 62 and a pusher 63 of the cam unit 60.

As shown in FIGS. 6 to 9C, the link mechanism 50 includes links 52 to 55 and the cam unit 60, and is disposed below the steering portion 1. The cam unit 60 includes a cam holder 61, the cam member 62, the pusher 63, a compression spring 64, and a spring holding plate 65, and is attached to an attachment plate 66 fixed to the supporting bases 23 and 24 with screws 81. A rotary shaft 67 that pivotally supports the cam holder 61 and the cam member 62 is fixed to the attachment plate 66 by a nut 83. The rotary shaft 67 is disposed to be substantially parallel to the swing shaft 31 at a position with substantially equal interval to each of the swing shaft 31 of the operation lever 3 and the swing shaft 41 of the operation lever 4 in the left-right direction. The substantially equal interval includes a configuration in which a center of the rotary shaft 67 is shifted within a range of tolerance, in addition to a configuration in which the center of the rotary shaft 67 is positioned at a center of an imaginary line connecting a center of the swing shaft 31 and a center of the swing shaft 41. In addition, the substantially parallel configuration includes a configuration in which the swing shaft 31 and the rotary shaft 67 are shifted within the range of tolerance, in addition to a configuration in which the swing shaft 31 and the rotary shaft 67 are completely parallel to each other.

One end portion 52a of the link 52 is coupled to a connection portion 3c of the operation lever 3 by a nut 86, and the other end portion 52b is coupled to the link 53 by fastening. Since the link 52 is coupled to the operation lever 3, the link 52 swings integrally with the operation lever 3 as the operation lever 3 swings. One end portion 53a of the link 53 is fastened and coupled to the link 52, and the other end portion 53b is fastened and coupled to a link coupling portion 61a of the cam holder 61 of the cam unit 60. The link 53 linearly moves to the left in accordance with the swing of the link 52 in the arrow R1 direction, and linearly moves to the right with the swing of the link 52 in the arrow R2 direction.

One end portion 54a of the link 54 is coupled to a connection portion 4c of the operation lever 4 by a nut 87, and the other end portion 54b is coupled to a link 55 by fastening. Since the link 54 is coupled to the operation lever 4, the link 54 swings integrally with the operation lever 4 as the operation lever 4 swings. One end portion 55a of the link 55 is fastened and coupled to the link 54, and the other end portion 55b is fastened and coupled to a link coupling portion 61b of the cam holder 61 of the cam unit 60. The link 55 linearly moves to the right in accordance with the swing of the link 54 in the arrow R3 direction, and linearly moves to the left with the swing of the link 54 in the arrow R4 direction.

The cam holder 61 as a rotary member is attached to the rotary shaft 67 through a bearing 85 and a washer 82 so as to be rotatable in an arrow W1 direction and an arrow W2 direction which is a direction opposite thereto, as shown in FIG. 8. The link coupling portion 61a to which the link 53 is coupled and the link coupling portion 61b to which the link 55 is coupled are provided on a back surface side (a rear surface side) of the cam holder 61. The link coupling portion 61a and the link coupling portion 61b are disposed symmetrically with respect to the rotary shaft 67. Further, a cam attaching portion 61c to which the cam member 62 is fitted is provided on a surface side (a front surface side) of the cam holder 61, and two recessed portions 61c1 for positioning the cam member 62 are formed on the cam attaching portion 61c. A shaft hole 61d through which the rotary shaft 67 is inserted is provided in a central portion of the cam holder 61.

The cam member 62 is fitted and held by the cam attaching portion 61c of the cam holder 61, and rotates integrally with the cam holder 61. The cam member 62 has two convex portions 62b fitted into the two recessed portions 61c1 of the cam holder 61 to position with respect to the cam holder 61. A shaft hole 62c through which the rotary shaft 67 is inserted is provided in a central portion of the cam member 62. A cam surface 62a for controlling a position of the pusher 63 is provided on a surface (a front surface) of the cam member 62.

The cam surface 62a has two neutral surfaces 62a3 as neutral points which are on surfaces substantially parallel to a plane H orthogonal to a rotation axis L of the cam member 62, two inclined surfaces 62a1 as a first inclined surface and a third inclined surface which are surfaces inclined forward with respect to the plane H and disposed downstream of the neutral surfaces 62a3 in the arrow W1 direction (a rotation side in the arrow W1 direction) as a first rotation direction, and two inclined surfaces 62a2 as a second inclined surface and a fourth inclined surface which are surfaces inclined forward with respect to the plane H and disposed downstream of the neutral surfaces 62a3 in the arrow W2 direction (a rotation side in the arrow W2 direction) as a second rotation direction. The two inclined surfaces 62a1 are disposed at positions symmetrical to each other with respect to the rotation axis L of the cam member 62, the two inclined surfaces 62a2 are disposed at positions symmetrical to each other, and the two neutral surfaces 62a3 are arranged at positions symmetrical to each other. In the embodiment, an inclination angle θ1 of the inclined surface 62a1 is smaller than an inclination angle θ2 of the inclined surface 62a2, and the inclined surface 62a2 is a curved surface.

The pusher 63 is a cylindrical member that linearly moves along the cam surface 62a of the cam member 62 in directions approaching and separating from the spring holding plate 65 in accordance with the rotation of the cam member 62. On a back surface of the pusher 63, two protrusions 63a are provided as a first protrusion and a second protrusion that protrude toward the cam member 62 and come into contact with the cam surface 62a of the cam member 62. The two protrusions 63a are disposed symmetrically with respect to the rotation axis L of the cam member 62, and the pusher 63 is disposed such that the protrusions 63a are positioned on the neutral surfaces 62a3 in a free state in which the operation levers 3 and 4 are not operated to swing. A spring seat surface 63b for holding one end portion 64a of the compression spring 64 is provided inside a cylinder of the pusher 63.

The spring holding plate 65 is a metal plate having a circular shape, and a spring seat surface (not shown in the drawings) for holding the other end portion 64b of the compression spring 64 is provided on a back surface of the spring holding plate 65. A shaft hole 65a through which the rotary shaft 67 is inserted is provided in a central portion of the spring holding plate 65. A tip end portion 67a of the rotary shaft 67 is inserted into the shaft hole 65a of the spring holding plate 65 and then fastened by a nut 84. In this way, the cam member 62, the pusher 63, the compression spring 64, and the spring holding plate 65 are prevented from coming off the rotary shaft 67. The bearing 85, the washer 82, and the cam holder 61 are sandwiched between the attachment plate 66 and a flange portion 67b of the rotary shaft 67, and thus the bearing 85, the washer 82, and the cam holder 61 are prevented from coming off the rotary shaft 67.

When the operation lever 3 is operated to swing in the arrow R1 direction, the link 52 coupled to the operation lever 3 swings in the arrow R1 direction, and the link 53 coupled to the other end portion 52b of the link 52 linearly moves to the left, and thus the cam holder 61 coupled to the other end portion 53b of the link 53 rotates in the arrow W1 direction about the rotary shaft 67. When the cam holder 61 rotates in the arrow W1 direction, the link 55 coupled to the cam holder 61 linearly moves to the right, and the link 54 coupled to the one end portion 55a of the link 55 and the operation lever 4 coupled to the one end portion 54a of the link 54 swing integrally in the arrow R3 direction about the swing shaft 41.

When the operation lever 3 is operated to swing in the arrow R2 direction, the link 52 coupled to the operation lever 3 swings in the arrow R2 direction, and the link 53 coupled to the other end portion 52b of the link 52 linearly moves to the right, and thus the cam holder 61 coupled to the other end portion 53b of the link 53 rotates in the arrow W2 direction about the rotary shaft 67. When the cam holder 61 rotates in the arrow W2 direction, the link 55 coupled to the cam holder 61 linearly moves to the left, and the link 54 coupled to the one end portion 55a of the link 55 and the operation lever 4 coupled to the one end portion 54a of the link 54 swing integrally in the arrow R4 direction about the swing shaft 41.

When the operation lever 4 is operated to swing in the arrow R3 direction, the link 54 coupled to the operation lever 4 swings in the arrow R3 direction, and the link 55 coupled to the other end portion 54b of the link 54 linearly moves to the right, and thus the cam holder 61 coupled to the other end portion 55b of the link 55 rotates in the arrow W1 direction about the rotary shaft 67. When the cam holder 61 rotates in the arrow W1 direction, the link 53 coupled to the cam holder 61 linearly moves to the left, and the link 52 coupled to the one end portion 53a of the link 53 and the operation lever 3 coupled to the one end portion 52a of the link 52 swing integrally in the arrow R1 direction about the swing shaft 31.

When the operation lever 4 is operated to swing in the arrow R4 direction, the link 54 coupled to the operation lever 4 swings in the arrow R4 direction, and the link 55 coupled to the other end portion 54b of the link 54 linearly moves to the left, and thus the cam holder 61 coupled to the other end portion 55b of the link 55 rotates in the arrow W2 direction about the rotary shaft 67. When the cam holder 61 rotates in the arrow W2 direction, the link 53 coupled to the cam holder 61 linearly moves to the right, and the link 52 coupled to the one end portion 53a of the link 53 and the operation lever 3 coupled to the one end portion 52a of the link 52 swing integrally in the arrow R2 direction about the swing shaft 31.

In this way, the link mechanism 50 synchronizes the swing motion of the operation lever 3 in the arrow R1 direction and the swing motion of the operation lever 4 in the arrow R3 direction, and synchronizes the swing motion of the operation lever 3 in the arrow R2 direction and the swing motion of the operation lever 4 in the arrow R4 direction. With such a configuration, it is possible to prevent an erroneous operation in which the accelerator operation is performed by the operation lever 3 and the brake operation is performed by the operation lever 4.

When the cam holder 61 rotates in the arrow W1 direction in accordance with the swing operations of the operation levers 3 and 4 in the arrow R1 direction and in the arrow R3 direction, the cam member 62 held by the cam holder 61 also rotates in the arrow W1 direction integrally with the cam holder 61. When the cam member 62 rotates in the arrow W1 direction, the pusher 63 positioned on the neutral surfaces 62a3 moves forward while compressing the compression spring 64 against a biasing force of the compression spring 64 along the inclined surfaces 62a1 of the cam surface 62a of the cam member 62 (FIGS. 9A and 9B). Thereafter, when the swing operations of the operation levers 3 and 4 are released, the pusher 63 is biased rearward by a restoring force of the compression spring 64, the cam member 62 receiving the biasing force via the pusher 63 rotates in the arrow W2 direction to return to a phase before rotation, and the pusher 63 also returns to the neutral surfaces 62a3. Further, by the cam member 62 rotating in the arrow W2 direction to return to the phase before the rotation, the links 52 to 55 move as described above, and accordingly, the operation levers 3 and 4 swing in the arrow R2 direction and the arrow R4 direction, respectively, and return to initial positions before the swing operation.

Similarly, when the cam holder 61 rotates in the arrow W2 direction in accordance with the swing operations of the operation levers 3 and 4 in the arrow R2 direction and in the arrow R4 direction, the cam member 62 held by the cam holder 61 also rotates in the arrow W2 direction integrally with the cam holder 61. When the cam member 62 rotates in the arrow W2 direction, the pusher 63 positioned on the neutral surfaces 62a3 moves forward while compressing the compression spring 64 against a biasing force of the compression spring 64 along the inclined surfaces 62a2 of the cam surface 62a of the cam member 62 (FIGS. 9A and 9C). Thereafter, when the swing operations of the operation levers 3 and 4 are released, the pusher 63 is biased rearward by a restoring force of the compression spring 64, the cam member 62 receiving the biasing force via the pusher 63 rotates in the arrow W1 direction to return to a phase before rotation, and the pusher 63 also returns to the neutral surfaces 62a3. Further, by the cam member 62 rotating in the arrow W1 direction to return to the phase before the rotation, the links 52 to 55 move as described above, and accordingly, the operation levers 3 and 4 swing in the arrow R1 direction and the arrow R3 direction, respectively, and return to initial positions before the swing operation.

Thus, the cam surface 62a of the cam member 62 has a shape in which the pusher 63 is moved in a direction in which the compression spring 64 is elastically deformed against the biasing force of the compression spring 64 even when the cam member 62 rotates in any direction of the arrow W1 direction and the arrow W2 direction. Then, when the swing operations of the operation levers 3 and 4 are released, the cam member 62 that receives the biasing force of the compression spring 64 via the pusher 63 rotates and returns to the phase before the rotation, and the operation levers 3 and 4 return to the initial positions. As described above, according to the configuration of the embodiment, when the swing operations of the operation levers 3 and 4 for inputting the accelerator operation or the brake operation are released, the operation levers 3 and 4 can be returned to the initial positions by the common cam member 62, the pusher 63, and the compression spring 64, the number of components can be reduced, and the operation levers 3 and 4 can be returned to the initial positions with a simple configuration.

In addition, a force required for the swing operation for the accelerator operation of the operation levers 3 and 4 is mainly determined by a spring pressure of the compression spring 64 and the inclination angle of the inclined surfaces 62a1 of the cam surface 62a of the cam member 62, although a frictional resistance and the like between the members constituting the link mechanism 50 has certain influence. Similarly, a force required for the swing operation for the brake operation of the operation levers 3 and 4 is mainly determined by the spring pressure of the compression spring 64 and the inclination angle of the inclined surfaces 62a2 of the cam surface 62a of the cam member 62. Therefore, by adjusting the inclination angles of the inclined surfaces 62a1 and 62a2, it is possible to adjust a relationship between an operation stroke and an operation load of the operation levers 3 and 4, and to set the forces required for the swing operations for the accelerator operation or the brake operation of the operation levers 3 and 4, respectively. As described above, according to the configuration of the embodiment, the forces required for the swing operations for inputting the accelerator operation or the brake operation can be set by the common cam member 62, the pusher 63, and the compression spring 64, and the force required for the swing operation for inputting the accelerator operation and the force required for the swing operation for inputting the brake operation can be set with a simple configuration.

In the embodiment, the inclination angle $\theta1$ of the inclined surface 62a1 and the inclination angle $\theta2$ of the inclined surface 62a2 are different angles. With such a configuration, the relationship between the operation stroke and the operation load of the accelerator operation of the operation levers 3 and 4, and the relationship between the operation stroke and the operation load of the brake operation may be different from each other, and the force required for the swing operation for the accelerator operation and the force required for the swing operation for the brake operation may be different from each other. For example, during normal driving, a frequency of the accelerator operation is generally higher than a frequency of the brake operation. Therefore, by making the inclination angle $\theta1$ of the inclined surface 62a1 smaller than the inclination angle $\theta2$ of the inclined surface 62a2 as in the embodiment, the force required for the swing operation for the accelerator operation can be made smaller than the force required for the swing operation for the brake operation, and driving comfort for the driver can be improved.

In the embodiment, the inclined surface 62a2 is a curved surface. Accordingly, the force required for the swing operation for the brake operation can be increased in a non-linear manner as the swing angle increases. Note that, a configuration may be adopted in which the inclined surface 62a1 is formed by a curved surface, and the force required for the swing operation for the accelerator operation is increased in the non-linear manner as the swing angle increases. For example, the force required for the swing operation for the accelerator operation is reduced at the start of the accelerator operation, and the force required for the swing operation is increased in the non-linear manner when the swing angle exceeds a predetermined angle. Therefore, it is possible to prevent the driver from excessively increasing a speed. In order to provide non-linearity between the swing angle and the force required for the swing operation for the accelerator operation or the brake operation of the operation levers 3 and 4, a configuration may be adopted in which a plurality of inclined surfaces having different inclination angles are continuously disposed in a rotation direction of the cam member 62 at positions corresponding to the inclined surfaces 62a1 or the inclined surfaces 62a2 on the cam surface 62a, or a configuration may be adopted in which a surface parallel to the curved surface or the neutral surface 62a3 may be disposed between the plurality of inclined surfaces.

In the embodiment, the pusher 63 is in contact with the cam surface 62a of the cam member 62 with the two protrusions 63a. With such a configuration, since the pusher 63 is in contact with the cam surface 62a at least at two points, the pusher 63 can stably follow the cam surface 62a as compared with a configuration in which the pusher 63 is in contact with the cam surface 62a at one point.

In the embodiment, the link mechanism 50 is disposed below the steering wheel 10 with respect to the steering portion 1. With such a configuration, when an airbag (not shown in the drawings) is activated, it is possible to prevent the activated airbag from interfering with the members constituting the link mechanism 50 and hindering inflation.

In the embodiment, the configuration in which the swing motions of the operation levers 3 and 4 are synchronized by using the link mechanism 50 is described, and the present disclosure is not limited thereto. The swing motions of the operation levers 3 and 4 may be synchronized by another power transmission mechanism that mechanically transmits power of one of the operation levers 3 and 4 during swinging of the operation levers 3 and 4 to the other. As another power transmission mechanism, for example, a configuration may be adopted in which the swing motions of the operation levers 3 and 4 are synchronized using a gear train that rotates in accordance with the swing operations of the operation levers 3 and 4 and transmits a driving force. However, when using the gear train, since a plurality of support shafts for supporting gears are required, from the viewpoint of reducing a size of the steering wheel 10, it is preferable to use the link mechanism 50 as in the configuration of the embodiment. Similarly, in the embodiment, the configuration in which the cam unit 60 is operated by rotating the cam holder 61 using the links 52 to 55 is described, and the present disclosure is not limited thereto. The cam unit 60 may be operated by rotating the cam holder 61 by another power transmission mechanism that mechanically transmits the power of one of the operation levers 3 and 4 during swinging of the operation levers 3 and 4 to the other.

In addition, in the embodiment, the configuration in which the operation levers 3 and 4 are disposed inside the steering portion 1 is described, and the present disclosure is not limited thereto. That is, the operation levers 3 and 4 may be disposed at positions adjacent to the steering portion 1 outside the steering portion 1. However, by disposing the operation levers 3 and 4 inside the steering portion 1 as in the configuration of the embodiment, it is possible to reduce the size of the steering wheel 10 without causing the operation levers 3 and 4 to protrude to the outside of the steering portion 1.

In the embodiment, the configuration in which the compression spring 64 is used as the member that applies the biasing force to the cam member 62 to return the cam member 62 to the phase before the rotation is described, and the present disclosure is not limited thereto, and other springs may be used. For example, by adopting a configuration in which a tension spring is provided instead of the compression spring 64 and the cam surface 62a has a shape in which the pusher 63 is moved in a direction in which the tension spring is elastically deformed against the biasing force of the tension spring even when the cam member 62 rotates in any direction of the arrow W1 direction and the arrow W2 direction, the same effect as described above can be obtained.

REFERENCE SIGNS LIST

1: steering portion
2: boss portion
3, 4: operation lever
10: steering wheel
50: link mechanism
52 to 55: link
61: cam holder
62: cam member
62a: cam surface
63: pusher
64: compression spring

The invention claimed is:
1. A steering wheel comprising:
a steering portion which is gripped and steered by a driver;
a boss portion which is disposed inside the steering portion and is coupled to a steering center shaft of the steering portion; and
an operation portion which is disposed adjacent to the steering portion, and is configured to be swingable with respect to the steering portion, to input an accelerator operation by being operated to swing in a first direction with respect to the steering portion, and to input a brake operation by being operated to swing in a second direction opposite to the first direction, wherein:
the operation portion is a right operation portion disposed on a right side with respect to the boss portion,
the steering wheel further comprises a left operation portion which is disposed on a left side of the boss portion, and is configured to be swingable with respect to the steering portion, to input the accelerator operation by being operated to swing in a third direction with respect to the steering portion, and to input the brake operation by being operated to swing in a fourth direction opposite to the third direction,
swing of the right operation portion in the first direction and swing of the left operation portion in the third direction are synchronized with each other, and the swing of the right operation portion in the second direction and the swing of the left operation portion in the fourth direction are synchronized with each other, by a power transmission mechanism mechanically transmitting power of one of the right operation portion or the left operation portion during swinging to other of the right operation portion or the left operation portion,
a right swing shaft, which is a swing shaft of the right operation portion, is disposed along a direction intersecting with a left-right direction at the right side of the boss portion,
a left swing shaft, which is a swing shaft of the left operation portion, is disposed substantially parallel to the right swing shaft at a position symmetrical to the right swing shaft with respect to the boss portion, and
the power transmission mechanism is a link mechanism including
a rotary member in which a rotary shaft is disposed so as to be substantially parallel to the left swing shaft at a position with substantially equal interval to each of the left swing shaft and the right swing shaft in the left-right direction,
a first link coupled to the rotary member and configured to rotate the rotary member in a first rotation direction by moving in conjunction with a swing operation of the right operation portion in the first direction, and to rotate the rotary member in a second rotation direction opposite to the first rotation direction by moving in conjunction with a swing operation of the right operation portion in the second direction, and a second link coupled to the rotary member at a position symmetrical to a coupling position between the first link and the rotary member with respect to the rotary shaft, and configured to rotate the rotary member in the first rotation direction by moving in conjunction with a swing operation of the left operation portion in the third direction, and to rotate the rotary member in the second rotation direction by moving in conjunction with a swing operation of the left operation portion in the fourth direction.

2. The steering wheel according to claim 1, wherein the operation portion swings in the first direction by being pressed by the driver, and swings in the second direction by being pulled up by the driver.

3. The steering wheel according to claim 1, wherein the link mechanism is disposed below the steering portion.

4. The steering wheel according to claim 1, wherein the steering portion is annular, and
the right operation portion and the left operation portion are disposed inside the steering portion.

5. A steering wheel comprising:
a steering portion which is gripped and steered by a driver;
a boss portion which is disposed inside the steering portion and is coupled to a steering center shaft of the steering portion; and
an operation portion which is disposed adjacent to the steering portion, and is configured to be swingable with respect to the steering portion, to input an accelerator operation by being operated to swing in a first direction with respect to the steering portion, and to input a brake operation by being operated to swing in a second direction opposite to the first direction, wherein:
the operation portion swings in the first direction by being pressed by the driver, and swings in the second direction by being pulled up by the driver,
the operation portion is a right operation portion disposed on a right side with respect to the boss portion,
the steering wheel further comprises a left operation portion which is disposed on a left side of the boss portion, and is configured to be swingable with respect to the steering portion, to input the accelerator operation by being operated to swing in a third direction with respect to the steering portion, and to input the brake operation by being operated to swing in a fourth direction opposite to the third direction, swing of the right operation portion in the first direction and swing of the left operation portion in the third direction are synchronized with each other, and the swing of the right operation portion in the second direction and the swing of the left operation portion in the fourth direction are synchronized with each other, by a power transmission mechanism mechanically transmitting power of one of the right operation portion or the left operation portion during swinging to other of the right operation portion or the left operation portion, a right swing shaft, which is a swing shaft of the right operation portion, is disposed along a direction intersecting with a left-right direction at the right side of the boss portion, a left swing shaft, which is a swing shaft of the left operation portion, is disposed substantially parallel to the right swing shaft at a position symmetrical to the right swing shaft with respect to the boss portion, and the power transmission mechanism is a link mechanism including
a rotary member in which a rotary shaft is disposed so as to be substantially parallel to the left swing shaft at a position with substantially equal interval to each of the left swing shaft and the right swing shaft in the left-right direction,
a first link coupled to the rotary member and configured to rotate the rotary member in a first rotation direction by moving in conjunction with a swing operation of the right operation portion in the first direction, and to rotate the rotary member in a second rotation direction opposite to the first rotation direction by moving in conjunction with a swing operation of the right operation portion in the second direction, and
a second link coupled to the rotary member at a position symmetrical to a coupling position between the first link and the rotary member with respect to the rotary shaft, and configured to rotate the rotary member in the first rotation direction by moving in conjunction with a swing operation of the left operation portion in the third direction, and to rotate the rotary member in the second rotation direction by moving in conjunction with a swing operation of the left operation portion in the fourth direction.

6. The steering wheel according to claim 5, wherein the link mechanism is disposed below the steering portion.

7. The steering wheel according to claim 5, wherein the steering portion is annular, and
the right operation portion and the left operation portion are disposed inside the steering portion.

* * * * *